(12) United States Patent
Yoshikawa (10) Patent No.: US 8,711,256 B2
(45) Date of Patent: Apr. 29, 2014

(54) IMAGE PROCESSING APPARATUS, IMAGE PROCESSING METHOD, AND PROGRAM TO CREATE A COMPOSITE IMAGE FROM COLOR IMAGE DATA AND MONOCHROME IMAGE DATA

(75) Inventor: Koichi Yoshikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 56 days.

(21) Appl. No.: 13/090,709

(22) Filed: Apr. 20, 2011

(65) Prior Publication Data
US 2011/0279698 A1 Nov. 17, 2011

(30) Foreign Application Priority Data

May 12, 2010 (JP) ................... 2010-109983

(51) Int. Cl.
*H04N 9/68* (2006.01)
*H04N 9/09* (2006.01)

(52) U.S. Cl.
USPC ................ 348/262; 348/234; 348/33

(58) Field of Classification Search
None
See application file for complete search history.

(56) References Cited

U.S. PATENT DOCUMENTS

| | | | | |
|---|---|---|---|---|
| 6,597,807 | B1 * | 7/2003 | Watkins et al. | 382/164 |
| 2001/0046316 | A1 * | 11/2001 | Miyano et al. | 382/154 |
| 2003/0093805 | A1 * | 5/2003 | Gin | 725/105 |
| 2004/0090550 | A1 * | 5/2004 | Park | 348/350 |
| 2004/0135881 | A1 * | 7/2004 | Jones et al. | 348/33 |
| 2004/0196371 | A1 * | 10/2004 | Kono et al. | 348/162 |
| 2006/0266942 | A1 * | 11/2006 | Ikeda | 250/334 |
| 2007/0222854 | A1 * | 9/2007 | Pochapsky | 348/33 |
| 2007/0247517 | A1 * | 10/2007 | Zhang et al. | 348/30 |
| 2009/0002475 | A1 * | 1/2009 | Jelley et al. | 348/14.01 |
| 2009/0207272 | A1 * | 8/2009 | Culbert et al. | 348/223.1 |
| 2011/0080498 | A1 * | 4/2011 | Kawada | 348/222.1 |
| 2011/0090379 | A1 * | 4/2011 | Koizumi | 348/242 |
| 2011/0169911 | A1 * | 7/2011 | Gabura | 348/32 |
| 2012/0200734 | A1 * | 8/2012 | Tang | 348/223.1 |
| 2012/0224019 | A1 * | 9/2012 | Samadani et al. | 348/14.01 |

FOREIGN PATENT DOCUMENTS

JP 2007-184805 7/2007

* cited by examiner

*Primary Examiner* — Twyler Haskins
*Assistant Examiner* — Dwight C Tejano
(74) *Attorney, Agent, or Firm* — Oblon, Spivak, McClelland, Maier & Neustadt, L.L.P.

(57) ABSTRACT

There is provided an image processing apparatus including an image acquisition unit that obtains color image data composed of wavelength components in a visible light region only, and monochrome image data which does not contain the wavelength components in the visible light region and which is composed of wavelength components in other than visible light region only, a color information extraction unit that extracts color information from the color image data, a luminance information extraction unit that extracts luminance information from the monochrome image data, and a synthesis unit that synthesizes the extracted color information and the extracted luminance information to generate composite image data.

11 Claims, 11 Drawing Sheets

| OUTPUT | BLACK AND WHITE | COLOR |
|---|---|---|
| SENSITIVITY | 400lx F5.6 (0dB) | 2000lx F5.6 (0dB) |
| MINIMUM SUBJECT LUMINANCE | 1lx (GAIN+18dB, F1.4) | 8lx (GAIN+18dB, F1.4) |

IMAGE PROCESSING APPARATUS, IMAGE PROCESSING METHOD, AND PROGRAM TO CREATE A COMPOSITE IMAGE FROM COLOR IMAGE DATA AND MONOCHROME IMAGE DATA

BACKGROUND OF THE INVENTION

1. Field of the Invention

The present invention relates to an image processing apparatus, an image processing method, and a program.

2. Description of the Related Art

The wide-area surveillance camera that takes an image of outdoor etc. is mainly requested for the following three conditions. A first condition to be requested is to image clearly a subject to be noted even in a shooting condition in which the subject is hard to be seen due to the fog, the mist, or the like. A second condition is to image the subject even in a dark environment with low illuminance. A third condition is to obtain a color image because identification by color information, such as color of clothes, may be important in many cases.

Explanations will be given on states satisfying or not-satisfying the above three conditions in a case using a camera with a single-chip color image pickup device of the past.

First of all, the first condition will be explained. It is important that lights reflected on a subject can be reached to an image pickup device of a camera without being decreased in order to image the subject clearly. In a space where the lights reflected on the subject travel to the camera, there existed air ($N_2$ molecule, or the like), moisture such as a fog, airborne particles such as smog, sand or the like. These objects scatter the lights and prevent a clear shooting opportunity.

According to Rayleigh scattering formula where the equality is attained if the airborne particle is small as an air molecule of 0.37 nm in diameter or a portion of smog, a scattering intensity is proportional to the inverse 4th power of the light wavelength. Moreover, the Mie theory will be applied to a grain size of fog, or the like, which is about 1000 nm to 50 μm in diameter, and the scattering intensity is proportional to about in the range of the 0 to the inverse square of the light wavelength. In the visible light of wavelength 400 nm to 700 nm, wavelengths of blue or green light in particular tend to be more scattered, and wavelengths of blue or green light don't reach a camera. Therefore, an image took by a camera that receives visible lights is close to a state visible to the human eye, and the subject in the distance will be hazy with low visibility.

Next, the second condition will be explained. Since the single-chip color image pickup device is mounted with a red, green, blue color filter in front of the photodetector, the sensibility of the photodetector of each color of the red, green, and blue will be lower than the sensibility of a monochrome image pickup device. There is a method (for example, a night-mode imaging) for temporarily saving an IR cut-off filter set in front of an image pickup device and for illuminating the subject by infrared light in order to compensate low sensibility in imaging in a dark environment with low illuminance. However, in an infrared imaging, it is difficult to image a color image, and it is also difficult to improve the sensitivity substantially since it has to be passed through the red, green and blue filter in front of the photodetector in the infrared imaging.

On the other hand, a single-chip monochrome image pickup device is capable of imaging an image with higher sensitivity and higher spatial resolution than the single-chip color image pickup device. However, since the monochrome image pickup device is not capable of obtaining color information, the above-mentioned third condition is not to be fulfilled.

SUMMARY OF THE INVENTION

JP 2007-184805A discloses a technology for extracting luminance information from image data contained visible lights and infrared lights in order to reproduce a color image in which each of color information and luminance information is optimal, for extracting the color information from a visible image after excluding infrared components, and for synthesizing the luminance information and the color information. However, JP 2007-184805A has an issue that it cannot qualify the above first condition to image a subject clearly since it used an image data contained visible light when extracting the luminance information.

In light of the foregoing, it is desirable to provide an image processing apparatus, an image processing method, and a program, which are novel and improved, and which are capable of imaging a subject even in a shooting condition in which the subject is hard to be seen due to the haze or the like, or in a dark environment with low illuminance, and capable of obtaining color images.

According to an embodiment of the present invention, there is provided an image processing apparatus including an image acquisition unit that obtains color image data composed of wavelength components in a visible light region only, and monochrome image data which does not contain the wavelength components in the visible light region and which is composed of wavelength components in other than visible light region only, a color information extraction unit that extracts color information from the color image data, a luminance information extraction unit that extracts luminance information from the monochrome image data, and a synthesis unit that synthesizes the extracted color information and the extracted luminance information to generate composite image data.

The color image data may be composed of wavelength components shorter than a predetermined value only, and the monochrome image data may be composed of wavelength components longer than the predetermined value only.

The color image data may contain wavelength components in the range of 400 nm to 700 nm, and the monochrome image data may contain wavelength components in the range of 700 nm to 1000 nm.

The color image data may contain wavelength components whose a half-value wavelength on a short-wavelength side is in the range of 420 nm to 460 nm and a half-value wavelength on the long-wavelength side is in the range of 610 nm to 650 nm, and the monochrome image data may contain wavelength components whose a half-value wavelength on a short-wavelength side is in the range of 650 nm to 750 nm.

The image acquisition unit may obtain the monochrome image data composed of wavelength components in the visible light region close to an outer side of the visible light region and the wavelength components in an outside of the visible light region.

The color image data may be composed of wavelength components equals to or less than a first predetermined value only, and the monochrome image data may be composed of wavelength components equals to or larger than a second predetermined value, which is less than the first predetermined value.

According to another embodiment of the present invention, there is provided an image processing method including the steps of obtaining color image data composed of wavelength components in a visible light region only, and monochrome image data which does not contain the wavelength components in the visible light region and which is composed of wavelength components in an outside of the visible light region only, extracting color information from the color image data, extracting luminance information from the monochrome image data, and synthesizing the extracted color information and the extracted luminance information to generate composite image data.

According to the embodiments of the present invention described above, it is possible to provide a program causing a computer to execute the steps of obtaining color image data composed of wavelength components in a visible light region only, and monochrome image data which does not contain the wavelength components in the visible light region and which is composed of wavelength components in outside of the visible light region only, extracting color information from the color image data, extracting luminance information from the monochrome image data, and synthesizing the extracted color information and the extracted luminance information to generate composite image data.

As described above, according to the present invention, it is possible to image a subject in a shooting condition in which the subject is hard to be seen due to the fog or the like, or in a dark environment with low illuminance and to obtain a color image.

DETAILED DESCRIPTION OF THE EMBODIMENT(S)

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The explanation will be given hereinafter in the following order:
1. Configuration and Operation of an Embodiment
2. Modified Embodiment
1. Configuration and Operation of an Embodiment
[Configuration of Image Processing Apparatus 102]

Figure 1:
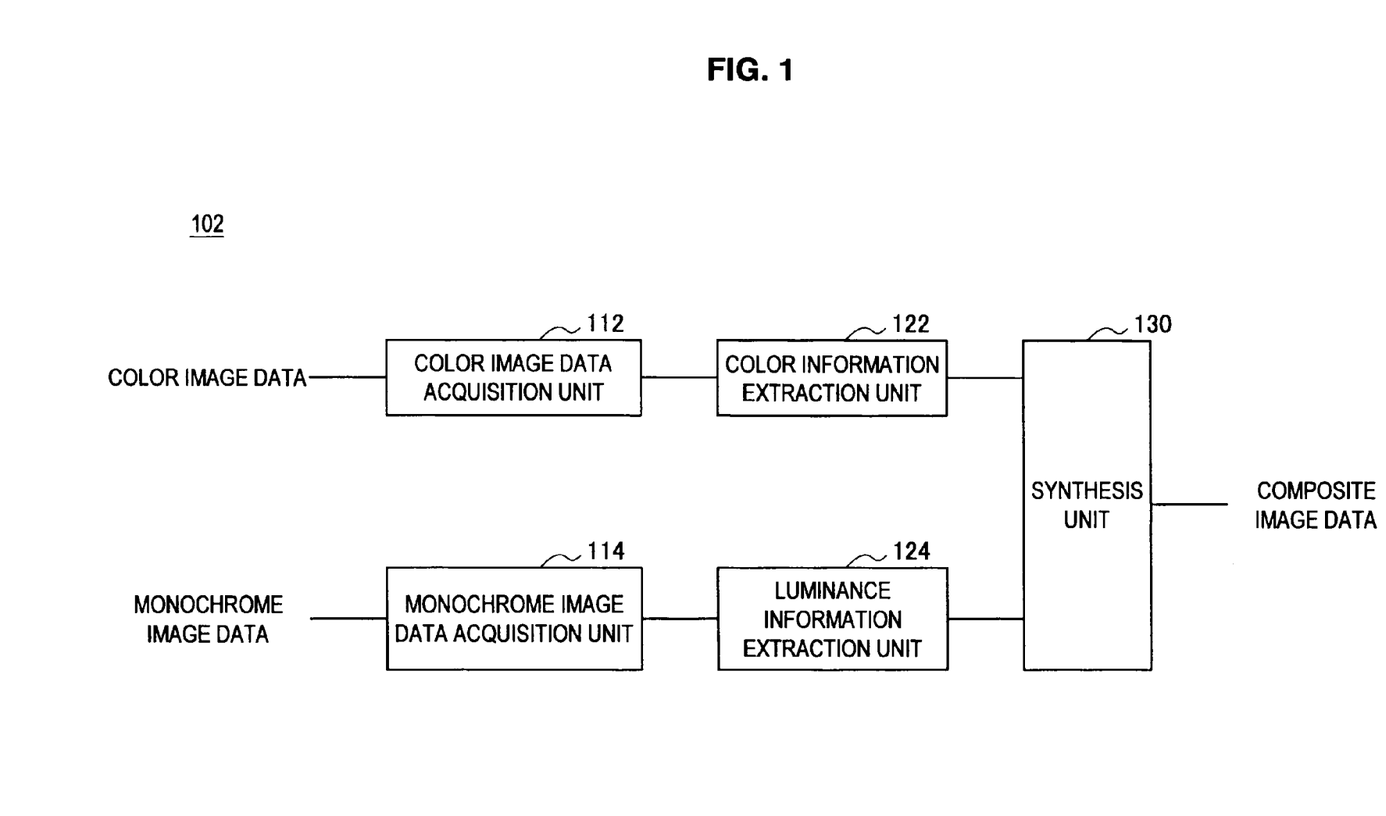
FIG. 1 is a block diagram for illustrating an image processing apparatus 102 according to an embodiment of the present invention.

At first, with reference to FIG. 1, an explanation will be given on the configuration of the image processing apparatus 102 according to an embodiment of the present invention. FIG. 1 is a block diagram for illustrating the image processing apparatus 102 according to the embodiment of the present invention.

The image processing apparatus 102 extracts color information from color image data composed of wavelength components in a visible light region only, extracts luminance information from monochrome image data which does not contain the wavelength components in the visible light region and which is composed of wavelength components in other than visible light region only, and synthesizes the color information and the luminance information to generate image data. This makes it possible to obtain an image data in which a subject is displayed clearly since an image data contained visible light is not used when extracting the luminance information.

The image processing apparatus 102 includes a color image data acquisition unit 112, a monochrome image data acquisition unit 114, a color information extraction unit 122, a luminance information extraction unit 124, and a synthesis unit 130, or the like.

The color image data acquisition unit 112 is an example of an image acquisition unit that obtains color image data obtained as the result of imaging using a color image pickup device. The color image pickup device is an image pickup device which is mounted with a red, green, blue color filter in front of the photodetector, and which outputs color image data composed of red-color components, green-color components, and blue-color components.

If the color image data obtained from the color image pickup device is composed of wavelength components in a visible light region only, the color image data acquisition unit 112 sends the color image data composed of wavelength components in the visible light region only as it is to the color information extraction unit 122. On the other hand, if the color image data obtained from the color image pickup device contains wavelength components of infrared light components or the like other than in the visible light region, the color image data acquisition unit 112 removes the wavelength components other than in the visible light region, and sends the color image data composed of wavelength components in the visible light region only, to the color information extraction unit 122.

By removing the wavelength components such as infrared light components or the like from the color image data, it becomes possible to obtain color image which can be received by human perception and easy to be recognized by human eyes.

The monochrome image data acquisition unit 114 is an example of the image acquisition unit and obtains monochrome image data obtained as the result of imaging using monochrome image pickup device. The monochrome image pickup device is an image pickup device which is not mounted with a color filter in front of a photodetector, and which outputs monochrome image data composed of luminance information. Since the monochrome image pickup device is not mounted with a color filter, it has higher sensitivity and is capable of imaging with higher spatial resolution than the color image pickup device.

If the monochrome image data obtained from the monochrome image pickup device is composed of wavelength components other than in a visible light region only, the monochrome image data acquisition unit 114 sends the monochrome image data composed of wavelength components other than in the visible light region only as it is to the luminance information extraction unit 124. On the other hand, if the monochrome image data obtained from the monochrome image pickup device contains wavelength components in the visible light region, the monochrome image data acquisition unit 114 removes the wavelength components in the visible light, and sends the monochrome image data composed of wavelength components other than in the visible light region only to the luminance information extraction unit 124.

By removing visible light components from the monochrome image data, it becomes possible to obtain monochrome image in which a subject is clear even in an environment with low vision clarity due to weather condition, such as foggy, hazy, etc.

The above-mentioned color image data may be composed of only wavelength components equals to or less than a predetermined value, 675 nm, for example, and the monochrome image data may be composed of wavelength components equals to or more than the predetermined value, 675 nm, for example. Note that the predetermined value is not limited to the above examples. For example, the color image data may contain wavelength components in the range of 400 nm to 700 nm, and the monochrome image data may contain wavelength components in the range of 700 nm to 1000 nm. Moreover, the color image data may contain wavelength components whose a half-value wavelength on a short-wavelength side is in the range of 420 nm to 460 nm and a half-value wavelength on the long-wavelength side is in the range of 610 nm to 650 nm, and the monochrome image data may contain wavelength components whose a half-value wavelength on a short-wavelength side is in the range of 650 nm to 750 nm.

The color information extraction unit 122 decomposes the color image data received from the color image data acquisition unit 112, the color image data which is composed of wavelength components in the visible light region only, into luminance information Y1 and color difference information Cb and Cr, and extracts the color difference information Cb and Cr. The color difference information Cb and Cr are examples of color information. The color information extraction unit 122 sends the extracted color difference information Cb and Cr to the synthesis unit 130. The luminance information Y1 is not necessarily to be sent to the synthesis unit 130 since it is not to be used for the processing of synthesis in the synthesis unit 130.

In order to decompose color image data in which each of RGB is represented by 8 bits into the luminance information Y1 and the color difference information Cb and Cr, for example, the following mathematical formulas 1 to 3 can be used for converting RGB signals to YCbCr signals.

$Y1 = 0.257R + 0.504G + 0.098B + 16$ (Formula 1)

$Cb = -0.148R - 0.291G + 0.439B + 128$ (Formula 2)

$Cr = 0.439R - 0.368G - 0.071B + 128$ (Formula 3)

The luminance information extraction unit 124 extracts the monochrome image data received from the monochrome image data acquisition unit 114, the monochrome image data which is composed of wavelength components other than in a visible light region only, as the luminance information Y2. The luminance information extraction unit 124 sends the extracted luminance information Y2 to the synthesis unit 130.

The synthesis unit 130 synthesizes the color difference information Cb and Cr that are received from the color information extraction unit 122 and the luminance information Y2 that is received from the luminance information extraction unit 124, and generates composite image data. In order to generate color composite image data in which each of RGB is represented by 8 bits by synthesizing the color difference information Cb and Cr and the luminance information Y2, for example, the following formulas 4 to 6 can be used for converting YCbCr signals to RGB signals.

$R = 1.164(Y2-16) - 1.596(Cr-128)$ (Formula 4)

$G = 1.164(Y2-16) - 0.391(Cb-128) - 0.813(Cr-128)$ (Formula 5)

$B = 1.164(Y2-16) - 2.018(Cb-128)$ (Formula 6)

[Operation of Image Processing Apparatus 102]

Figure 4:
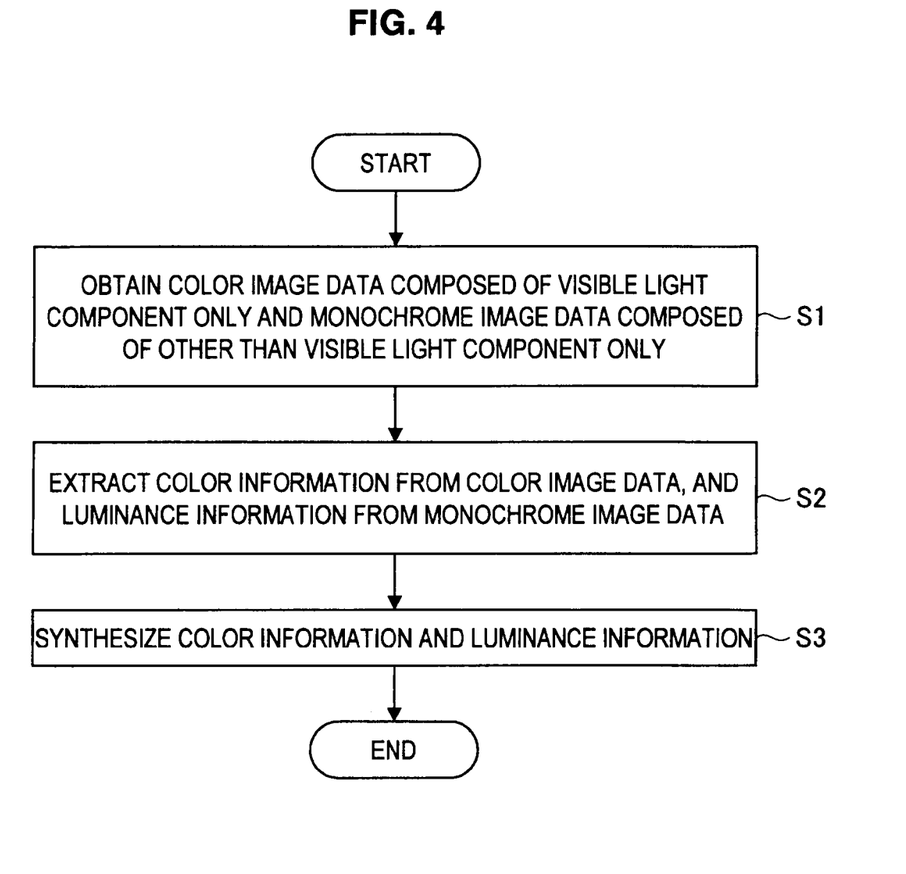
FIG. 4 is a flow chart for illustrating a synthesis processing of the image processing apparatus 102 according to the embodiment.

Next, with reference to FIG. 4, the processing of synthesis of the image processing apparatus 102 according to the present embodiment described above will be explained. FIG. 4 is a flow chart for illustrating a synthesis processing of the image processing apparatus 102 according to the embodiment.

First, the image processing apparatus 102 obtains color image data composed of wavelength components in a visible light region only and monochrome image data composed of wavelength components other than in the visible light region only (step S1).

Next, the color image data is decomposed into the luminance information Y1 and the color difference information Cb and Cr, and the color difference information Cb and Cr are extracted from the color image data. Further, the luminance information Y2 is extracted from the monochrome image data (step S2).

Subsequently, the color difference information Cb and Cr extracted from the color image data and the luminance information Y2 extracted from the monochrome image data are to be synthesized, and composite image data is to be generated (step S3).

[Imaging Apparatus 100]

Next, an explanation will be given on an imaging apparatus 100 to which the above-described image processing apparatus 102 will be applied. In other words, the explanation will be given on a case where the image processing apparatus 102 is built in the imaging apparatus 100 as a signal processing circuit.

Figure 2:
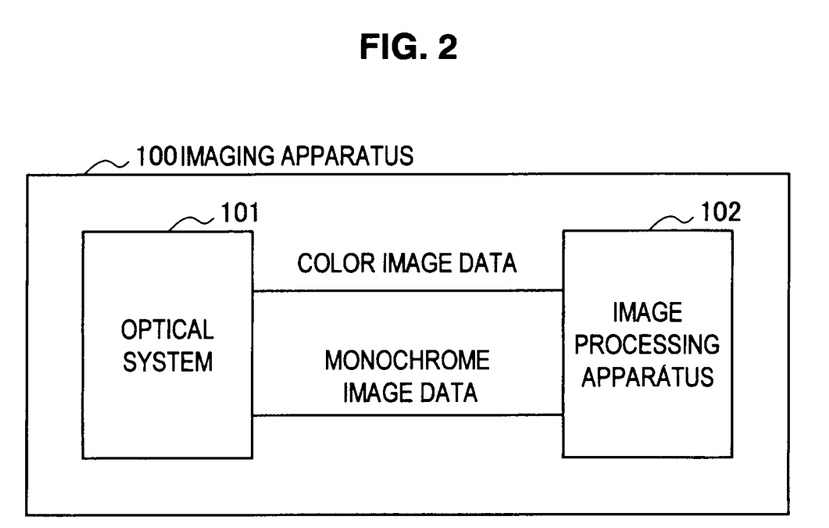
FIG. 2 is a block diagram for illustrating an imaging apparatus 100 according to the embodiment.

FIG. 2 is a block diagram for illustrating the imaging apparatus 100 according to the embodiment. The imaging apparatus 100 includes, for example, an optical system 101 and the image processing apparatus 102. The optical system 101 sends the color image data and the monochrome image data separately to the image processing apparatus 102 as shown in FIG. 2.

Figure 3:
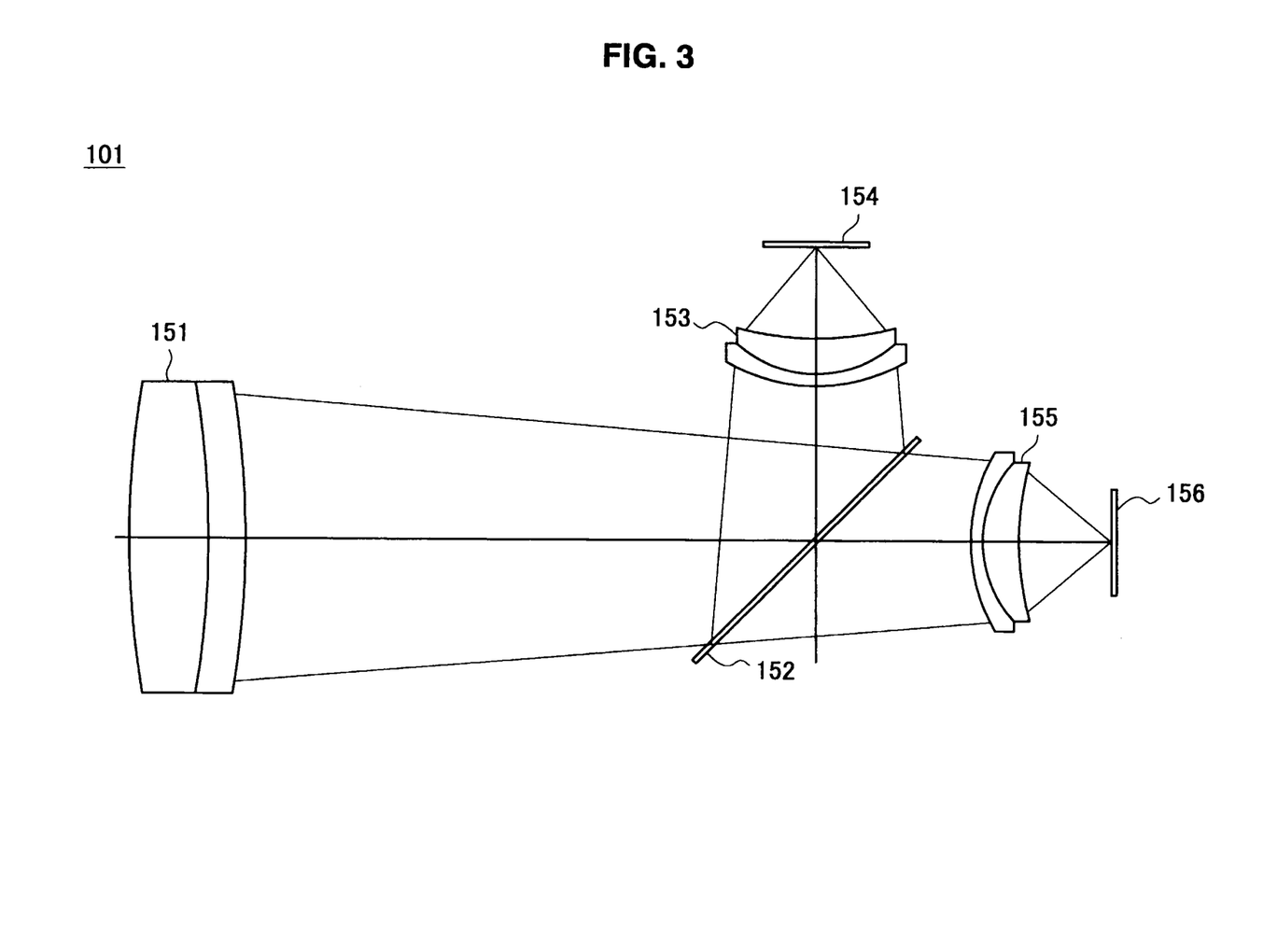
FIG. 3 is an explanatory diagram for illustrating an optical system 101 according to the embodiment.

FIG. 3 is an explanatory diagram for illustrating the optical system 101 according to the embodiment. FIG. 3 shows a schematic overview of each of optical components and an optical path.

The optical system 101 includes a front lens 151, a spectrum mirror 152, a lens group 153, a color image pickup device 154, a lens group 155, and a monochrome image pickup device 156, or the like. In the optical system 101 the spectrum mirror 152 disperses into a first light composed of wavelength components in a visible light region only, and a second light which does not contain the first light and which is composed of wavelength components in other than the visible light region only. The color image pickup device 154 receives the first light irradiated from an optical element, and the monochrome image pickup device 156 receives the second light irradiated from the optical element.

The front lens 151 receives lights reflected on a subject, transmits and refracts the lights came from the subject to irradiate the lights on the spectrum mirror 152.

The spectrum mirror 152 is evaporated a dichroic film on its surface. The spectrum mirror 152 reflects wavelength elements in the visible light region, such as wavelength elements in the visible light region equal to or less than 675 nm, for example, among incoming lights, and transmits wavelength elements in other than the visible light region, such as near-infrared light wavelength elements equal to or more than 675 nm, for example, among the incoming lights. The wavelength elements equal to or less than 675 nm is transmitted through the lens group 153, is irradiated on the color image pickup device 154 to form an image. Note that threshold value for the wavelength elements dispersed by the spectrum mirror 152 is not limited to 675 nm, but may be other value.

Figure 5:
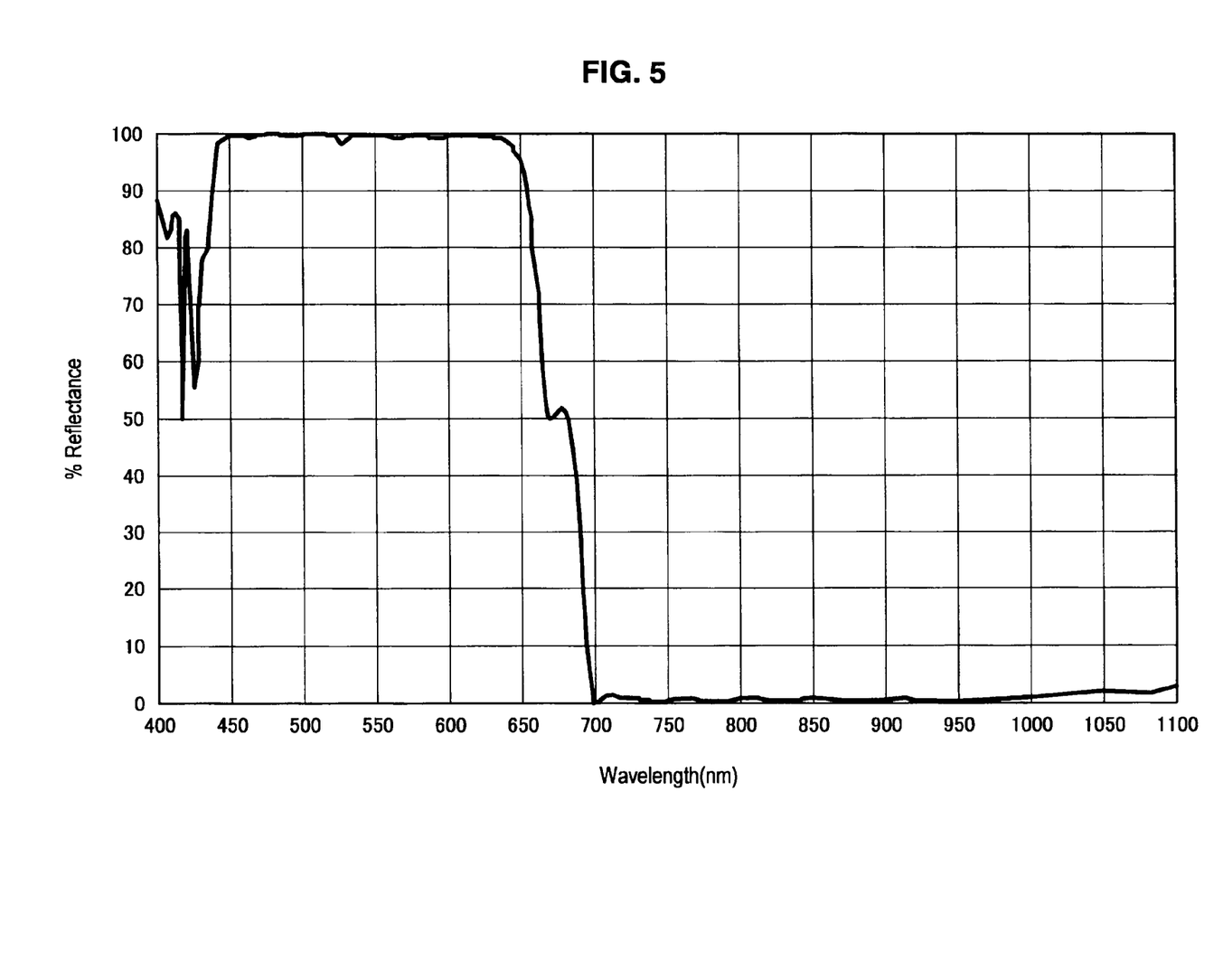
FIG. 5 is a graph for illustrating a spectral reflectance of light that is reflected on a spectrum mirror 152.
Figure 7:
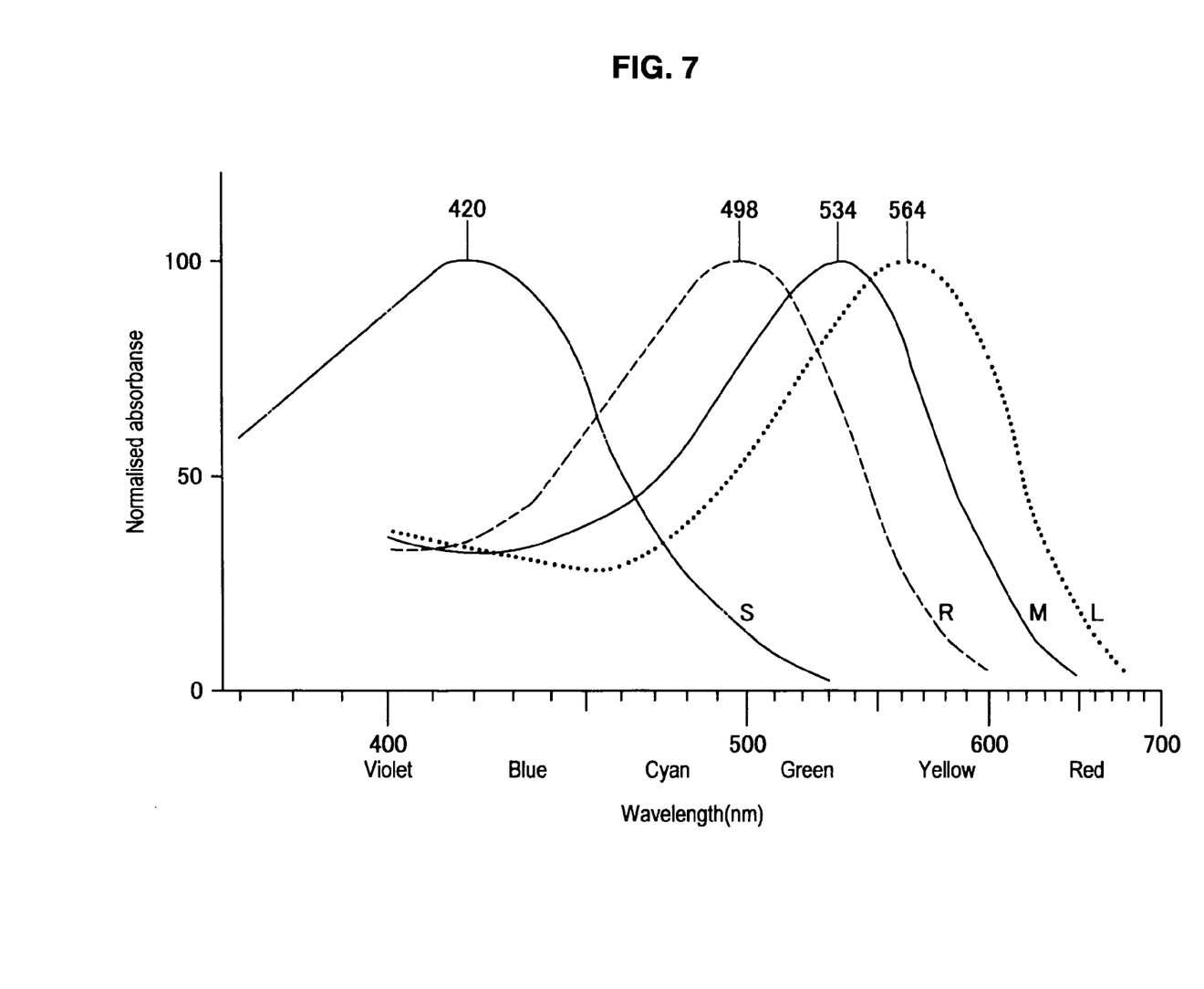
FIG. 7 is a graph for illustrating an absorption spectrum of visual pigment that is contained by cone cells (S, M, L) and rod cells (R) of a human body.

FIG. 5 is a graph for illustrating a spectral reflectance of light that is reflected on the spectrum mirror 152. As shown in FIG. 5, the spectrum mirror 152 leads lights mainly being equal to or less than wavelength 675 nm to the color image pickup device 154. Since it is understood that a spectral sensitivity of human eye is indicated like FIG. 7, the wavelength of lights lead by the color image pickup device 154 may be generally within the visible light region. FIG. 7 is a graph for illustrating an absorption spectrum of visual pigment that is contained by cone cells (S, M, L) and rod cells (R) of a human body.

Figure 6:
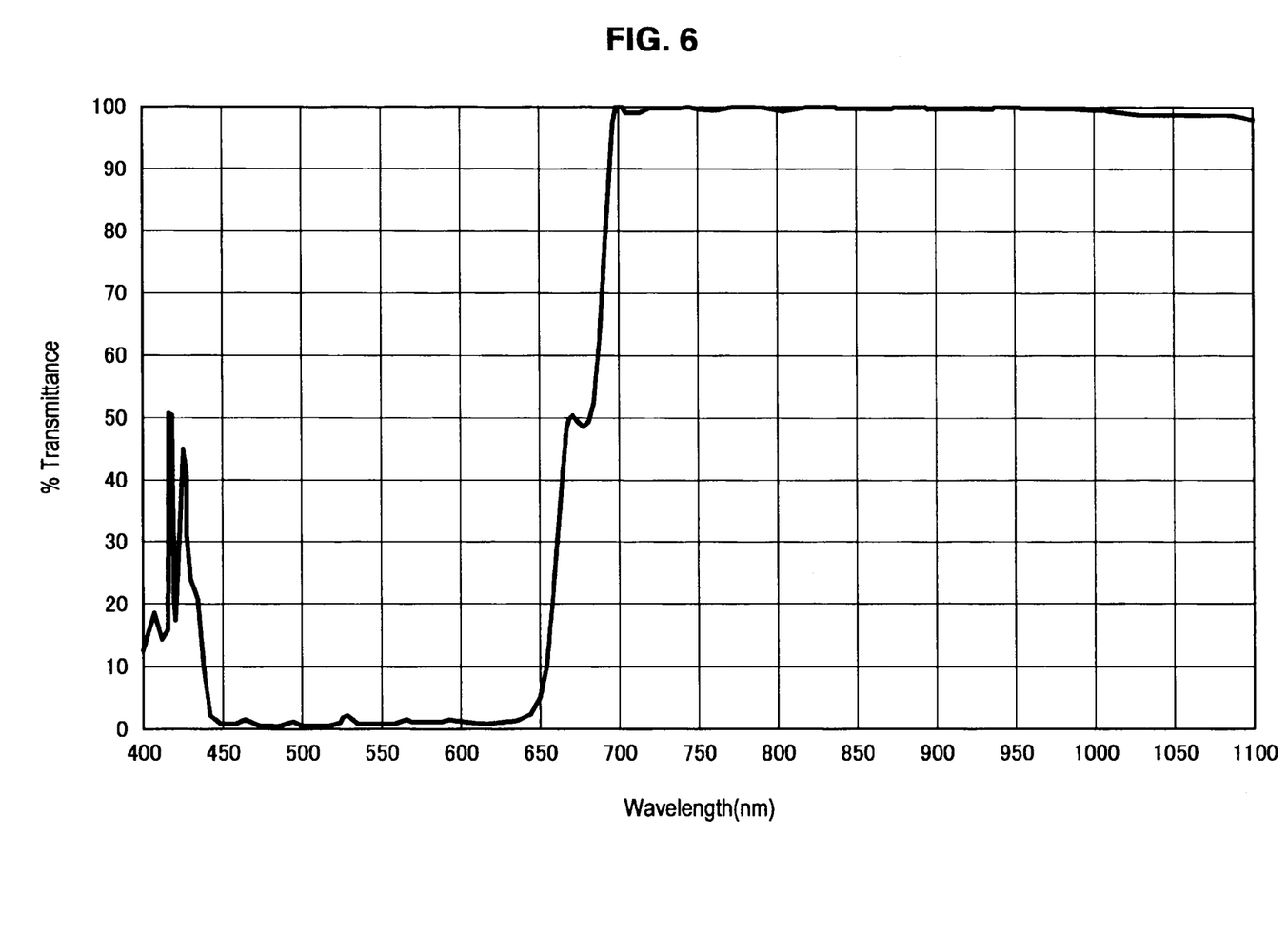
FIG. 6 is a graph for illustrating a spectral transmittance of light that is transmitted from the spectrum mirror 152.

FIG. 6 is a graph for illustrating a spectral transmittance of light that is transmitted through a spectrum mirror 152. As shown in FIG. 6, the spectrum mirror 152 leads lights mainly being equal to or more than wavelength 675 nm to the monochrome image pickup device 156. Referring to FIG. 7, the wavelength of lights lead by the monochrome image pickup device 156 may be generally within other than the visible light region.

Note that other optical components including an imaging lens has efficient transmittance in the wavelength in the range of 400 nm to 1100 nm, and never shield lights reached to the color image pickup device 154 and the monochrome image pickup device 156.

As the color image pickup device 154 and the monochrome image pickup device 156, various types of solid-state image pickup devices, such as a CCD solid-state image pickup device, a MOS solid-state image pickup device, a CMOS solid-state image pickup device, or the like, can be used. The color image pickup device 154 is an image pickup device which is mounted with a red, green, blue color filter in front of a photodetector, and which outputs color image data composed of red-color components, green-color components, and blue-color components. The monochrome image pickup device 156 is an image pickup device which is not mounted with a color filter in front of a photodetector, and which outputs monochrome image data composed of luminance information.

Figure 8:
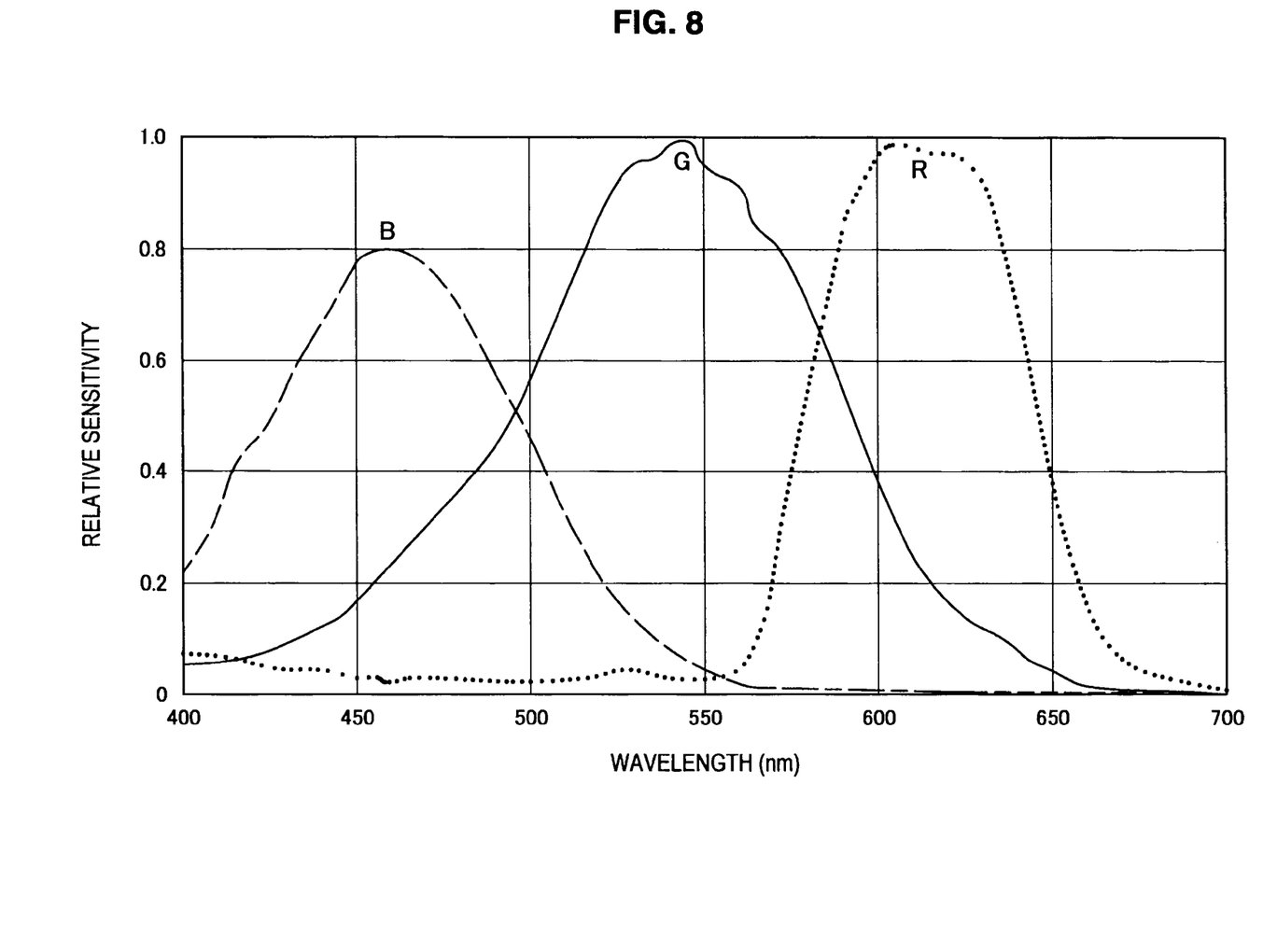
FIG. 8 is a graph for illustrating a spectral sensitivity characteristic of a color image pickup device 154.

FIG. 8 is a graph for illustrating a spectral sensitivity characteristic of a color image pickup device 154. It can be understood that the wavelength region equal to or less than wavelength 675 nm of the wavelength, which has been reflected on the spectrum mirror 152 and incoming to the color image pickup device 154 as illustrated in FIG. 5, matches to the region where the color image pickup device 154 shown in FIG. 8 has the spectral sensitivity. Therefore, the color image pickup device 154 is capable of catching the visible lights without loss.

Figure 9:
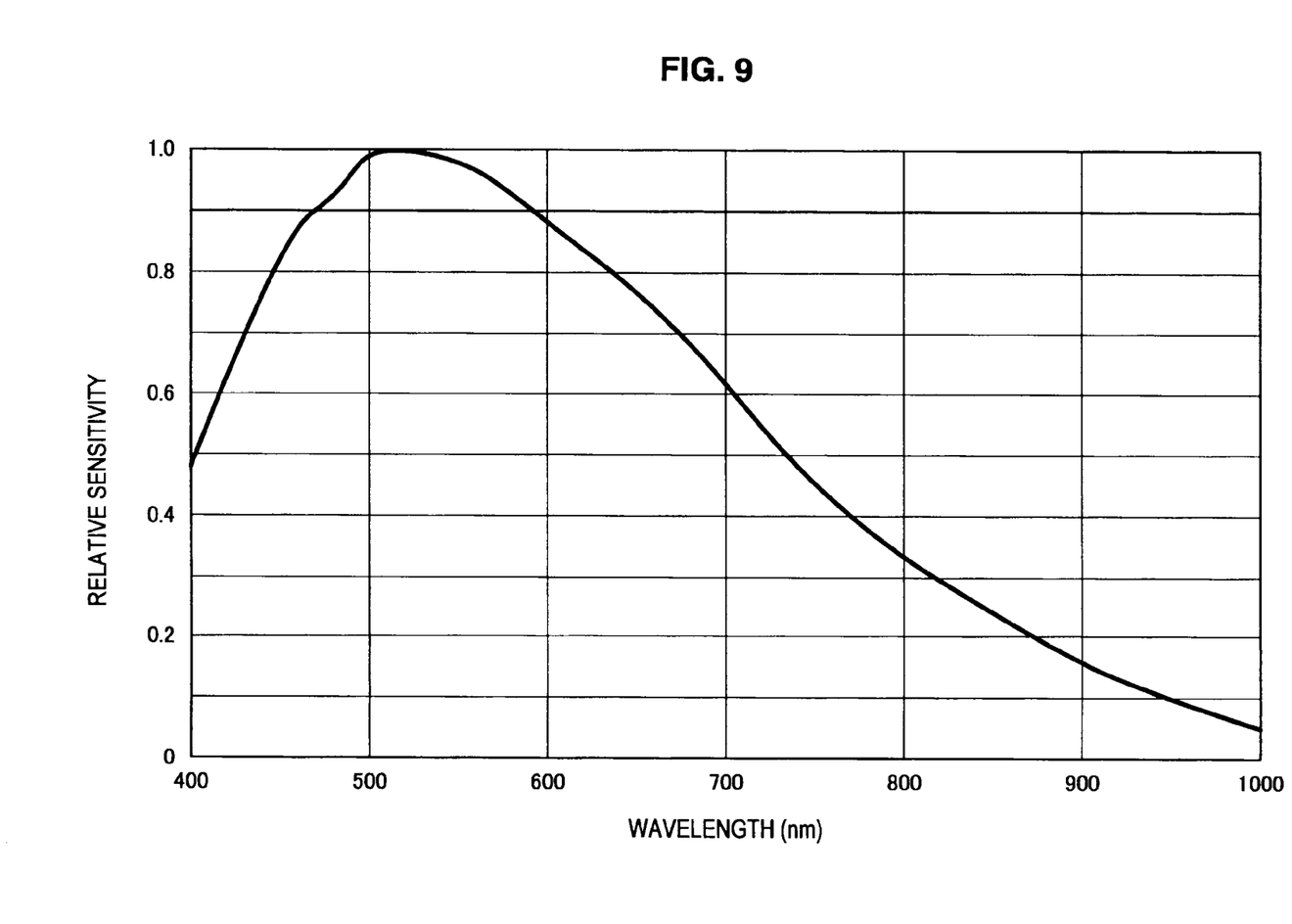
FIG. 9 is a graph for illustrating a spectral sensitivity characteristic of a monochrome image pickup device 156.

FIG. 9 is a graph for illustrating a spectral sensitivity characteristic of a monochrome image pickup device 156. As illustrating in FIG. 9, although the monochrome image pickup device 156 shows the maximum sensitivity in the visible light region, it still has efficient sensitivity in the near-infrared light region in the range of wavelength 675 nm to 1000 nm. Therefore, the monochrome image pickup device 156 can receive the wavelength components whose wavelength is equal to or longer than 675 nm, which is longer than the visible light transmitted through the spectrum mirror 152 and incoming to the monochrome image pickup device 156.

The color image pickup device 154 and the monochrome image pickup device 156 are positioned so that a subject image of the color image data matches a subject image of the monochrome image data. The positioning for matching the subject images may be performed by a mechanical method, by a method using software at the time of image synthesis, and by both of methods.

It is preferable if the optical sizes of the color image pickup device 154 and the monochrome image pickup device 156 are almost same. In such configuration, there is an advantage that view angles, depths of focus, and imaging regions are almost same in two optical systems which have been split by the spectrum mirror 152 without adjusting in particular.

In a case where the optical sizes of the color image pickup device 154 and the monochrome image pickup device 156 are the same, configuration will satisfy Mn≥Cn where the number of pixels of the color image pickup device 154 is Cn and the number of pixels of the monochrome image pickup device 156 is Mn. In this configuration, since the number of pixels Cn of the color image pickup device 154 is equal or less than the number of pixels Mn of the monochrome image pickup device 156, each size of pixels of the color image pickup device 154 becomes bigger than the size of pixels of the monochrome image pickup device 156. As the result, the sensitivity of the color image pickup device 154 can be set higher, improving its sensitivity than other color image pickup devices with large number of pixels. On the other hand, the number of pixels Mn of the monochrome image pickup device 156 is large, therefore the monochrome image pickup device 156 secures the high resolution.

[Effects of the Present Embodiment]

The imaging apparatus 100 of the present embodiment can obtain an optimal result by being applied to a wide-area surveillance camera, for example. According to the present embodiment, it is possible to satisfy the following three conditions particularly for the wide-area surveillance camera.

A first condition to be requested is to image clearly a subject to be noted even in a shooting condition in which the subject is difficult to be seen due to the fog, the mist, or the like. A second condition is to image the subject even in a dark environment with low illuminance. A third condition is to obtain a color image because identification by color information, such as color of clothes, may be often important in many cases.

First of all, the first condition is described. It is important that lights reflected on a subject can be reached to an image pickup device without being decreased in order to image the subject clearly. In the present embodiment, as a luminance signal influential over the image resolution, the near-infrared light (NIR) of wavelength in the range of 675 nm to 1000 nm longer than the visible light is used.

Figure 10:
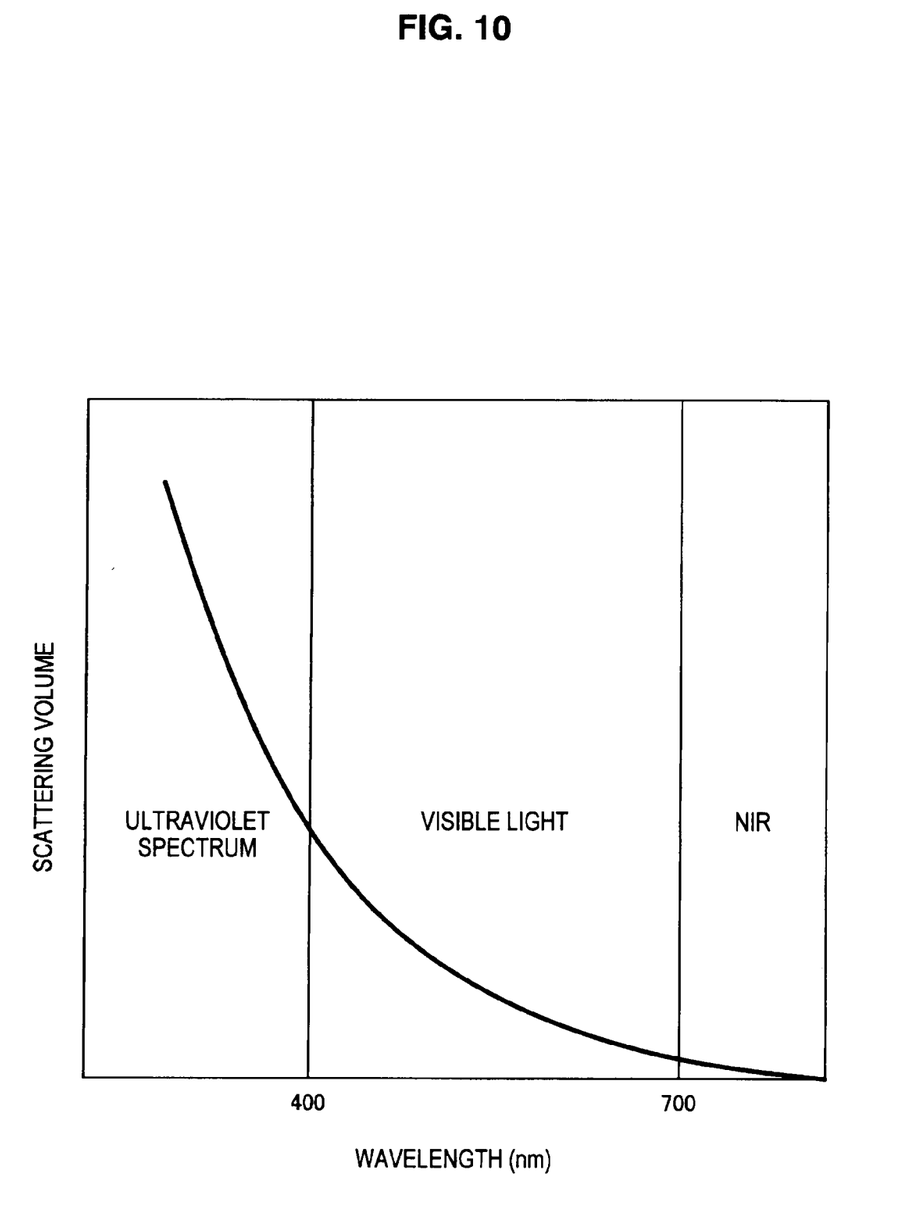
FIG. 10 is a graph for illustrating a relationship between scattering volume and wavelength according to the Rayleigh scattering formula.

FIG. 10 is a graph for illustrating a relationship between scattering volume and wavelength according to the Rayleigh scattering formula. According to the Rayleigh scattering formula, the scattering intensity is proportional to the inverse 4th power of the light wavelength where $d \leq \lambda/\pi$.

$$k_S = \frac{2\pi^5}{3} n \left(\frac{m^2-1}{m^2+2}\right)^2 \frac{d^6}{\lambda^4} \qquad \text{(Formula 7)}$$

Here, n is a particle count, d is a particle diameter (air molecule d=0.37 nm, smog d=1 nm to 1000 nm), m is reflection coefficient, and λ is wavelength of light. The reflection coefficient m is given in natural conditions, and the wavelength of light λ can be varied depending on a design condition of the imaging apparatus 100.

According to the Rayleigh scattering formula, the near-infrared light (NIR) has smaller scattering volume than the visible light in the range of wavelength 400 nm to 675 nm. For that reason, in the air, or in the environment where airborne particles whose diameter is equal to or less than about one third of the light wavelength are floating, even under the shooting condition in which the subject is difficult to be seen due to the fog, the mist, or the like, it is possible to image the subject to be noted more clearly than an ordinary camera, by applying to the technology of the present embodiment.

Further, according to the scattering formula of the Mie theory which can be applied to the environment where the airborne particles whose diameter is equal to or more than about one third of the light wavelength are floating, the scattering volume is proportional in the range of the 0 to the inverse square of the light wavelength. For this reason, even in an environment of the fog, the near-infrared light (NIR) is hard to be scattered than the visible light. Therefore, the present embodiment using the near-infrared light (NIR) makes it possible to image the subject even in the environment of the fog more clearly than the ordinary camera.

Next, the second condition is described. According to the present embodiment, it is possible to image the subject even in a dark environment with low illuminance. The present embodiment uses the near-infrared light (NIR) which the ordinary color camera does not use, and has an advantage at the low illuminance since NIR is included in the lights at dusk or artificial lightning. In addition, in order to receive the NIR, the present embodiment uses the monochrome image pickup device 156 which is capable of imaging with higher sensitivity and higher spatial resolution than the color image pickup device 154. Therefore, the present embodiment has an advantage at the low illuminance.

Figure 11:
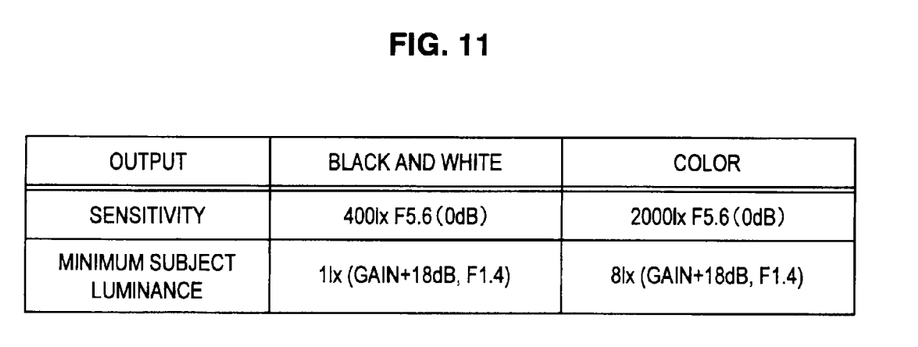
FIG. 11 is a table for illustrating an example of sensitivity and minimum subject illuminance of a monochrome camera and a color camera.

FIG. 11 is a table for illustrating an example of sensitivity and minimum subject illuminance of a monochrome camera and a color camera. This is an example of comparison between a color camera which is mounted with a RGB color filter in front of the same photodetector and a monochrome camera which is not mounted with a color filter in front of the photodetector. It is understood that the monochrome camera has a higher sensitivity and lower minimum subject illuminance comparing to the color camera. Since the color image pickup device is mounted with a RGB color filter in front of the photodetector, any pixel of each color of RGB has lower sensitivity comparing to the monochrome image pickup device.

Subsequently, the third condition will be explained. According to the present embodiment, color image will be obtained. The monochrome image pickup device can image at low illuminance, however, obviously it is difficult to obtain color information. On the other hand, the present embodiment uses both color information obtained from the color image pickup device 154 and luminance information obtained from the monochrome image pickup device to meet both the first and the second conditions, as well as satisfying the third condition to image color imaging.

<2. Modified Example>

Figure 12:
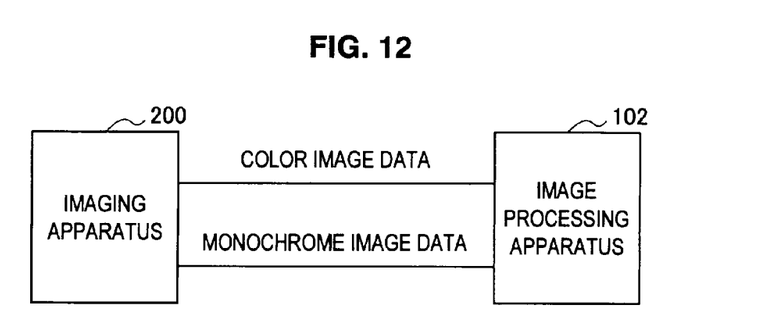
FIG. 12 is a block diagram for illustrating an imaging apparatus 200 and the image processing apparatus 102 according to a modified example of the embodiment of the present invention.

The image processing apparatus 102 described above has been explained in a case where it is built-in the imaging apparatus 100 as a signal processing circuit, however, the present invention is not limited to this example. For example, as illustrated in FIG. 12, the image processing apparatus 102 may be externally equipped to an imaging apparatus 200. FIG. 12 is a block diagram for illustrating the imaging apparatus 200 and the image processing apparatus 102 according to a modified example of the embodiment of the present invention. Here, the image processing apparatus 102 may be a personal computer, a server apparatus, or the like. The imaging apparatus 200 includes the above-described optical system 101, and outputs color image data composed of the wavelength components in the visible light region only and monochrome image data which does not include the wavelength components in the visible light region and is composed of the wavelength components in other than the visible light region only.

Figure 13:
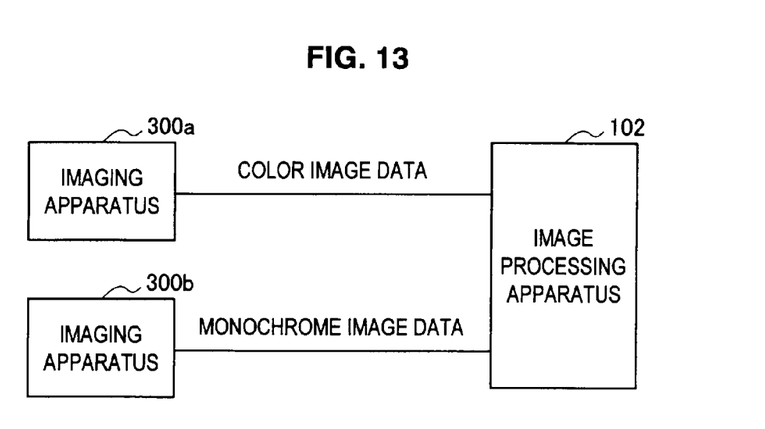
FIG. 13 is a block diagram for illustrating imaging apparatuses 300a, 300b, and the image processing apparatus 102 according to a modified example of the embodiment.

Moreover, as illustrated in FIG. 13, in the present invention, the image processing apparatus 102 may receive image data from two of imaging apparatuses 300*a* and 300*b*. FIG. 13 is a block diagram for illustrating imaging apparatuses 300*a*, 300*b*, and the image processing apparatus 102 according to a modified example of the embodiment. The imaging apparatus 300*a* is a camera which has a color image pickup device, is capable of imaging a color image, and outputs color image data composed of the wavelength components in the visible light region only. The imaging apparatus 300*b* is a camera which has a monochrome image pickup device, is capable of imaging a monochrome image, and outputs monochrome image data which does not include the wavelength components in the visible light region and is composed of the wavelength components in other than the visible light region only.

Note that in this modified example, the imaging apparatus 300*b* can image a monochrome image without using the optical system 101 unlike the above embodiment. Therefore, the wavelength components being output by the imaging apparatus 300*b* may be partially overlapped the wavelength components being output by the imaging apparatus 300*a*. For example, the color image data is composed of the wavelength components in the visible light region only, and the monochrome image data is composed of the wavelength components in the visible light region close to the outer side of the visible light region and the wavelength components in other than the visible light region. In other words, the color image data is composed of the wavelength components equal to or less than a first predetermined value only, and the monochrome image data is composed of the wavelength components equal larger than the second predetermined value which is less than the first predetermined value.

Thus, as the wavelength components of the monochrome image data includes the wavelength components of the visible light region close to the outer side of the visible light region, there is a possibility that a removing effect for fog, mist, or the like regarding the above-described first condition. On the other hand, since the amount of lights received is increased in the monochrome image data, as for the second condition, it becomes possible to image a subject even in a dark environment with further lower illuminance.

Note that timing for executing the above-described image processing is not particularly limited and may be various timings, such as in real-time, after the completion of imaging, or the like. For example, in a case where the imaging processing is to be performed in real-time, it is possible to create a composite image in a short period of time since it performs signal processing on image data obtained by imaging with the color image pickup device 154 and the monochrome image pickup device 156. On the other hand, it is also possible to store, once on a recording medium, the image obtained by imaging with color image pickup device 154 and the monochrome image pickup device 156, to call the image later to perform the image processing.

Note that by arranging the imaging apparatus 300b having a monochrome image pickup device and the imaging apparatus 300a having the color image pickup device so that their imaging regions are almost overlapped, it becomes possible to image same as the imaging apparatus of the present invention, however, there is a possibility that problems like a parallax disparity, a focal shift, or the like may occur because cameras are separated. On the other hand, the imaging apparatus 100 according to the first embodiment described above or the imaging apparatus 200 according to the modified embodiment have an advantage that the parallax disparity or the focal shift do not occur, since the monochrome image pickup device 156 and the color image pickup device 154 shares a camera in common.

Connections between the color image pickup device 154 and the monochrome image pickup device 156 with the image processing apparatus 102 or with a recording apparatus as the recording medium may be configured to exchange data through wire (such as a cable, telephone line, for example) or wireless. Further, there may be a case where a server apparatus on a network (intranet, interne, or the like) has software (a computer program) for performing the image processing so that the software can be accessed through the network to perform signal processing on images photographed by the color image pickup device 154 or the monochrome image pickup device 156.

A preferred embodiment of the present invention has been explained in detail above with reference to the attached drawings, the present invention is not limited to this example. It should be understood by those skilled in the art that various modifications, combinations, sub-combinations and alterations may occur depending on design requirements and other factors insofar as they are within the scope of the appended claims or the equivalents thereof.

In the imaging apparatus 100 according to the present embodiment described above, the spectrum mirror 152 for splitting incoming lights is arranged between the front lens 151 and the lens groups 153 and 155, however, in the present invention, there is no limitation on where to place an optical element for splitting the incoming lights, and it can be placed at another place. For example, it may be placed between the lens groups, or between a lens group and an image pickup device. Further, in stead of arranging a front lens, a lens with having the same function may be arranged in front of each lens group so that incoming lights can be split initially by the optical elements.

However, like the imaging apparatus 100 according to the above-described embodiment, if the spectrum mirror 152 is arranged between the front lens 151 and the lens groups 153 and 155, the front lens 151 is used in common. In this case, there is an advantage that influences such as aberration of the front lens 151 becomes even, and that it becomes possible to apply what are used in an ordinary camera without a change as the lens groups 153 and 155.

In the present invention, the optical element for splitting the incoming lights is not limited to the spectrum mirror 152, but may be other optical element, such as a combination of prism, or the like.

In the present invention, the number of split optical paths is not limited to two, but it may be three or more to be split in total. That is, an imaging apparatus may be configured by having a plurality of color image pickup devices or monochrome image pickup devices. For example, an example of the color image pickup device may be a three-chip color image pickup device mounted with an image pickup device for each color of R, G and B. An imaging apparatus may be configured by combining this three-chip color image pickup device and a monochrome image pickup device. In this case, an optical path will be split into four or more paths.

The present application contains subject matter related to that disclosed in Japanese Priority Patent Application JP 2010-109983 filed in the Japan Patent Office on May 12, 2010, the entire content of which is hereby incorporated by reference.

What is claimed is:

1. An image processing apparatus comprising:
circuitry that includes an RGB color filter and which is configured to
remove wavelength components that are not in a visible light region from color image data to produce filtered color image data composed of only wavelength components in the visible light region;
remove wavelength components that are in the visible light region from monochrome image data to produce filtered monochrome image data composed of wavelength components not in the visible light region;
decompose the filtered color image data into luminance information and color difference information;
extract only the color difference information associated with the filtered color image data and not the luminance information associated with the filtered color image;
output only the extracted color difference information and not the luminance information associated with the filtered color image;
extract luminance information associated with the filtered monochrome image data;
output the extracted luminance information associated with the filtered monochrome image data; and
synthesize the outputted color difference information and the outputted luminance information to generate composite image data.

2. The image processing apparatus according to claim 1, wherein the filtered color image data is composed of wavelength components shorter than a predetermined value only, and
the filtered monochrome image data is composed of wavelength components longer than the predetermined value only.

3. The image processing apparatus according to claim 1, wherein the filtered color image data contains wavelength components in the range of 400 nm to 700 nm, and
the filtered monochrome image data contains wavelength components in the range of 700 nm to 1000 nm.

4. The image processing apparatus according to claim 1, wherein the filtered color image data contains wavelength components having a half-value wavelength on a short-wavelength side in the range of 420 nm to 460 nm and a half-value wavelength on the long-wavelength side in the range of 610 nm to 650 nm, and wherein the filtered monochrome image data contains wavelength components having a half-value wavelength on a short-wavelength side in the range of 650 nm to 750 nm.

5. The image processing apparatus according to claim 1, wherein monochrome image data circuitry of said circuitry is configured to produce the filtered monochrome image data composed of only wavelength components outside of the visible light region.

6. The image processing apparatus according to claim 1, wherein the filtered color image data is composed of only wavelength components equal to or less than a first predetermined value, and the filtered monochrome image data is composed of wavelength components equal to or larger than a second predetermined value that is less than the first predetermined value.

7. The image processing apparatus according to claim 1, wherein a total number of pixels of a color image pickup device that picks up the color image data and a total number of pixels of a monochrome pickup device that picks up the monochrome image data satisfy Mn≥Cn, where Mn is the total number of pixels of the monochrome pickup device, and Cn is the total number of pixels of the color image pickup device.

8. An image processing method comprising:
removing, using color image acquisition circuitry that includes an RGB color filter, wavelength components that are not in a visible light region from color image data to produce filtered color image data composed of only wavelength components in the visible light region;
removing, using monochrome image data circuitry, wavelength components that are in visible light region from monochrome image data to produce filtered monochrome image data composed of wavelength components not in the visible light region;
decomposing the filtered color image data into luminance information and color difference information;
extracting only the color difference information associated with the filtered color image data and not the luminance information associated with the filtered color image;
outputting only the extracted color difference information and not the luminance information associated with the filtered color image;
extracting luminance information associated with the filtered monochrome image data;
outputting the extracted luminance information associated with the filtered monochrome image data; and
synthesizing the outputted color information and the outputted luminance information to generate composite image data.

9. The image processing method according to claim 8, wherein a total number of pixels associated with pick up of the color image data and a total number of pixels associated with pick up of the monochrome image data satisfy Mn≥Cn, where Mn is the total number of pixels associated with the monochrome pickup, and Cn is the total number of pixels associated with the color image pickup.

10. A non-transitory computer readable medium having instructions stored therein, which when executed by a processor causes the processor to execute a method comprising:
removing, using color image acquisition circuitry that includes an RGB color filter, wavelength components that are not in a visible light region from color image data to produce filtered color image data composed of only wavelength components in the visible light region;
removing, using monochrome image data circuitry, wavelength components that are in visible light region from monochrome image data to produce filtered monochrome image data composed of wavelength components not in the visible light region;
decomposing the filtered color image data into luminance information and color difference information;
extracting only the color difference information associated with the filtered color image data and not the luminance information associated with the filtered color image;
outputting only the extracted color difference information and not the luminance information associated with the filtered color image;
extracting luminance information associated with the filtered monochrome image data;
outputting the extracted luminance information associated with the filtered monochrome image data; and
synthesizing the outputted color information and the outputted luminance information to generate composite image data.

11. The non-transitory computer readable medium according to claim 10, wherein a total number of pixels associated with pick up of the color image data and a total number of pixels associated with pick up of the monochrome image data satisfy Mn≥Cn, where Mn is the total number of pixels associated with the monochrome pickup, and Cn is the total number of pixels associated with the color image pickup.

* * * * *